United States Patent
Jenkins

(10) Patent No.: US 10,601,895 B1
(45) Date of Patent: Mar. 24, 2020

(54) DATA TRANSFER BY DATA STORAGE DEVICE BASED ON RECEIVED UNIFORM RESOURCE LOCATOR INFORMATION

(71) Applicant: Western Digital Technologies, Inc., Irvine, CA (US)

(72) Inventor: Dean M. Jenkins, La Canada-Flintridge, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 602 days.

(21) Appl. No.: 14/195,079

(22) Filed: Mar. 3, 2014

Related U.S. Application Data

(60) Provisional application No. 61/925,093, filed on Jan. 8, 2014.

(51) Int. Cl.
 H04L 29/08 (2006.01)
(52) U.S. Cl.
 CPC .................................... H04L 67/06 (2013.01)
(58) Field of Classification Search
 CPC ...................................................... H04L 65/608
 USPC ........................................................ 709/217
 See application file for complete search history.

(56) References Cited

U.S. PATENT DOCUMENTS

| | | | |
|---|---|---|---|
| 6,499,054 B1 | 12/2002 | Hesselink et al. | |
| 6,732,158 B1 | 5/2004 | Hesselink et al. | |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 8,004,791 B2 | 8/2011 | Szeremeta et al. | |
| 8,255,661 B2 | 8/2012 | Karr | |
| 8,285,965 B2 | 10/2012 | Karr | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |

(Continued)

FOREIGN PATENT DOCUMENTS

| | | |
|---|---|---|
| WO | 2005022321 | 3/2005 |

OTHER PUBLICATIONS

"WIFI File Transfer," Google play, https://play.google.com/store/apps/details?id=com.smarterdroid.wififiletransfer, date is prior to filing date of Mar. 3, 2014, p. 1.

*Primary Examiner* — Vivek Srivastava
*Assistant Examiner* — Sibte Bukhari
(74) *Attorney, Agent, or Firm* — Chang & Hale LLP

(57) ABSTRACT

A data storage system including a data storage device located on a first network and configured to download data from a network site based on universal resource locator ("URL") information of the network site, and an electronic device located on a second network different than the first network. The electronic device can be configured to determine the URL information of the network site, determine a network address of the data storage device, and transmit the URL information to the data storage device using the network address of the data storage device, wherein receiving the URL information causes the data storage device to download data from the network site.

16 Claims, 6 Drawing Sheets

(56) References Cited

U.S. PATENT DOCUMENTS

| | | |
|---|---|---|
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 2005/0144195 A1 | 6/2005 | Hesselink et al. |
| 2005/0144200 A1 | 6/2005 | Hesselink et al. |
| 2005/0210098 A1* | 9/2005 | Nakamichi ........... G06F 3/0607 709/203 |
| 2010/0174774 A1 | 7/2010 | Kern et al. |
| 2012/0030294 A1* | 2/2012 | Piernot ............. G06F 17/30902 709/206 |
| 2012/0036041 A1 | 2/2012 | Hesselink |
| 2013/0185150 A1* | 7/2013 | Crum ..................... G06Q 30/02 705/14.49 |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0052860 A1* | 2/2014 | Duggal ................... H04L 41/00 709/225 |

\* cited by examiner

DATA TRANSFER BY DATA STORAGE DEVICE BASED ON RECEIVED UNIFORM RESOURCE LOCATOR INFORMATION

CROSS-REFERENCE TO RELATED APPLICATIONS

This application claims the benefit of U.S. Provisional Application No. 61/925,093, filed on Jan. 8, 2014, entitled "DATA TRANSFER BY DATA STORAGE DEVICE BASED ON RECEIVED UNIFORM RESOURCE LOCATER INFORMATION," which is hereby incorporated by reference in its entirety.

BACKGROUND

When a user attempts to view a website using a mobile phone, he may be utilizing a large amount of bandwidth. In some situations, the user only has a limited amount of bandwidth available or has to pay for data usage. Furthermore, the mobile phone may have a limited amount of storage space available. This may be a problem where the user wants to download data from the website, such as if the user wants to capture data from the website for archival purposes or later viewing. Since the website may comprise a large amount of data, it may be cost prohibitive for the user to download data from the website.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
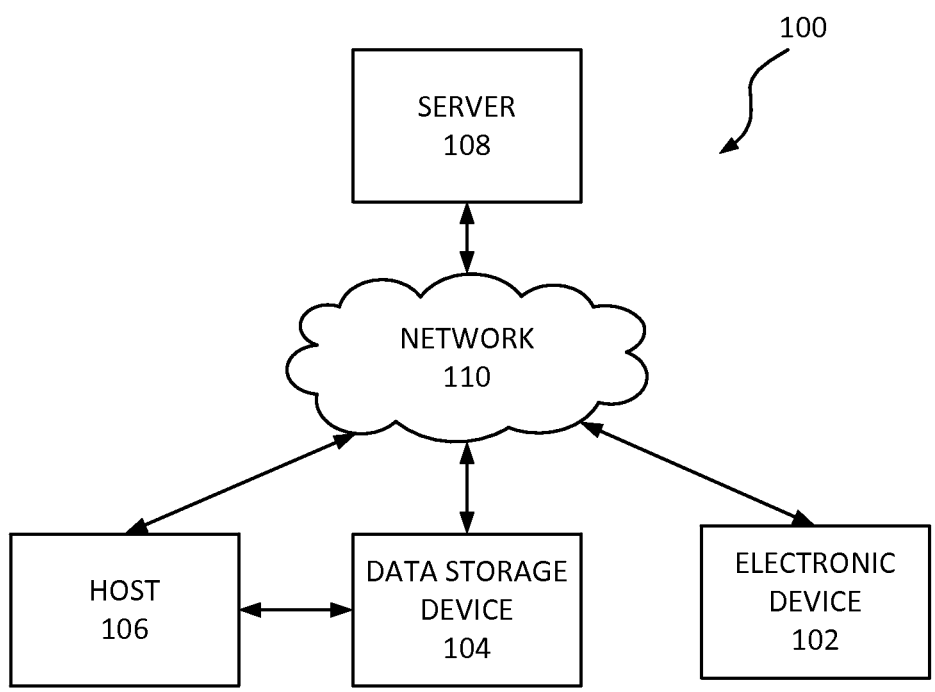
FIG. 1 depicts a data storage system according to an embodiment.

In an embodiment a data storage system 100 is shown in FIG. 1. The data storage system 100 can comprise an electronic device 102, a data storage device 104, a host 106, a server 108, or any combination thereof. The electronic device 102, the data storage device 104, the host 106, and/or the server 108 can be connected to a network 110. The network 110 can comprise, for example, a wide area network ("WAN"), a local area network ("LAN"), the Internet, or any combination thereof. In an embodiment, the data storage device 104 can be located on a first network, while the electronic device 102 can be located on a second network different than the first network. The first network and the second network can be configured to be connected to the network 110. Furthermore, in an embodiment, the first network can be configured to be a part of the network 110. Similarly, in an embodiment, the second network can be configured to be a part of the network 110.

The data storage device 104 can also be configured to be connected to the host 106. In an embodiment, the data storage device 104 comprises a network attached storage ("NAS"), a direct attached storage ("DAS"), or any combination thereof. In an embodiment, the host 106 can comprise a laptop, a computer, a tablet, a phone, or any other device which may want to access data on the data storage device 104.

Figure 2:
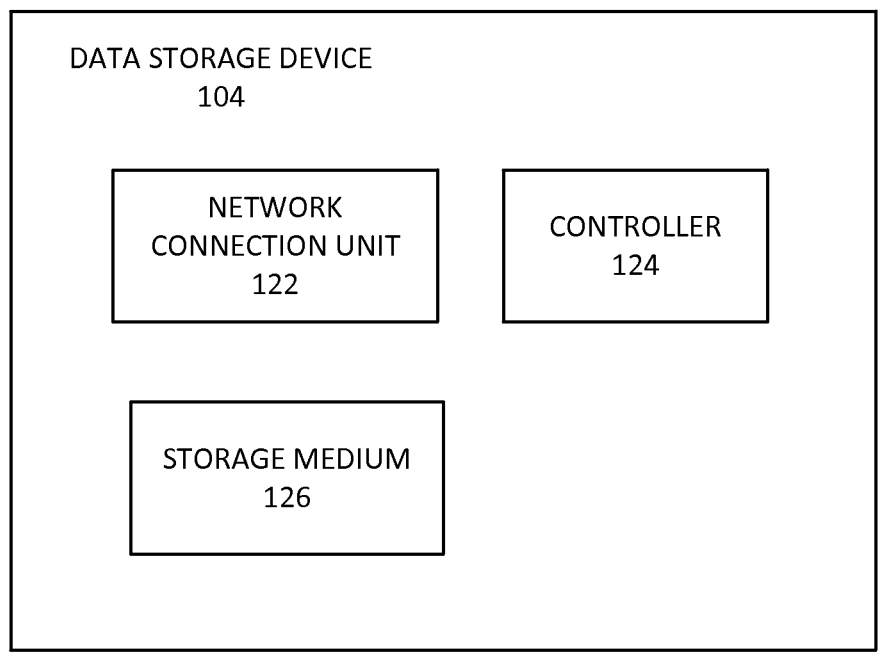
FIG. 2 depicts a data storage device according to an embodiment.

In the embodiment shown in FIG. 2, the data storage device 104 also comprises a network connection unit 122, a controller 124, and a storage medium 126. The network connection unit 122 can be utilized to access the network 110 in a wired or wireless manner. The controller 124 can control operations of the network connection unit 122 and also access to the storage medium 126. In an embodiment, the storage medium 126 can comprise a magnetic recording disk, a solid state memory, or any combination thereof.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

The data storage device 104 can also comprise a network address, which can be utilized to locate the data storage device 104 and/or transfer data to the data storage device 104. In an embodiment, the network address comprises an internet protocol ("IP") address associated with the data storage device 104. In an embodiment, the IP address comprises a static IP address. In an embodiment, the IP address comprises a dynamic IP address.

Furthermore, the data storage device 104 can also be associated with user account information. The user account information can also be associated with the network address of the data storage device 104. The user account information can be freely distributed and can also be used to identify the data storage device 104. In an embodiment, the server 108 is configured to store the network address and the user account information of the data storage device 104. For example, the data storage device 104 can be preregistered with the server 108 such that the server 108 can store the network address and the user account information of the data storage device 104.

The electronic device 102 is configured to connect to the network 110 and browse a network site such as web pages, Internet files, file transfer protocol ("FTP") sites, or other locations accessible via the network 110. The electronic device 102 can comprise, for example, a mobile communications device. The mobile communications device can comprise, for example, a phone, a smart phone, a tablet, a laptop, or any other device which is portable, but which can connect to the network 110 through a wired or wireless connection. In an embodiment, the electronic device 102 is shown in FIG. 3.

Figure 3:
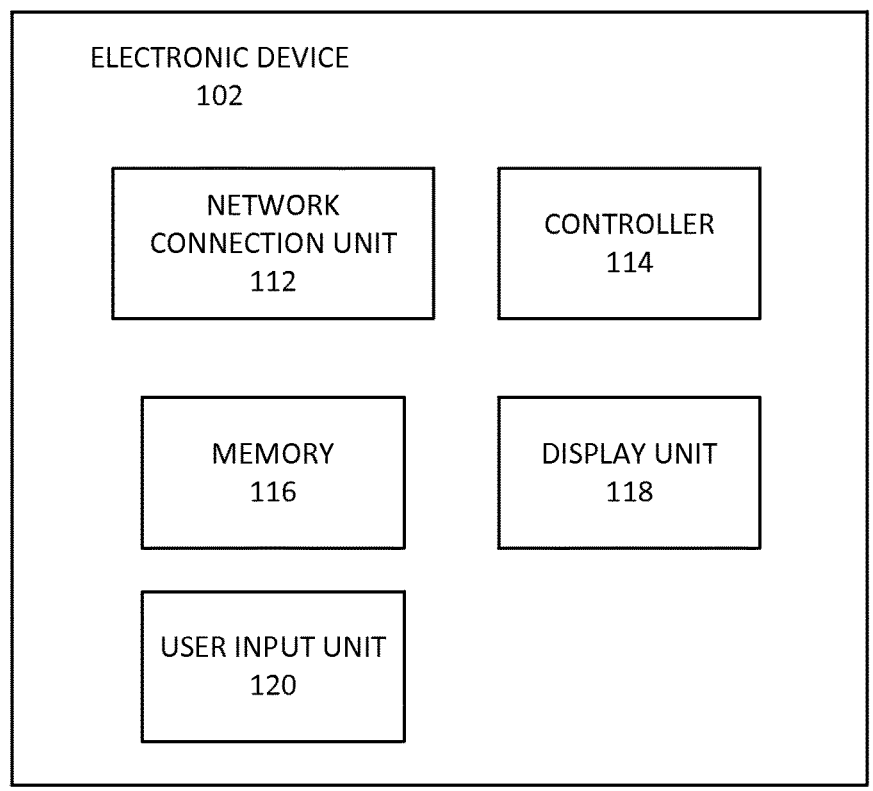
FIG. 3 depicts an electronic device according to an embodiment.

In the embodiment shown in FIG. 3, the electronic device 102 comprises a network connection unit 112, a controller 114, a memory 116, a display unit 118, and a user input unit 120. In an embodiment, the memory 116 comprises a magnetic rotating disk, a solid state memory, or any combination thereof. The network connection unit 112 is configured to connect to the network 110 in a wired or a wireless manner. The display unit 118 is configured to display text or graphics to the user. In an embodiment, the display unit 118 is configured to display the network site. The user input unit 120 is configured to receive a user input and can comprise, for example, a keyboard, a motion sensor, a touch sensor connected to the display unit 118, or other device which may receive the user input. In an embodiment, the controller 114 is configured to control operations of the network connection unit 112, the memory 116, the display unit 118, the user input unit 120, or any combination thereof.

Figure 4:
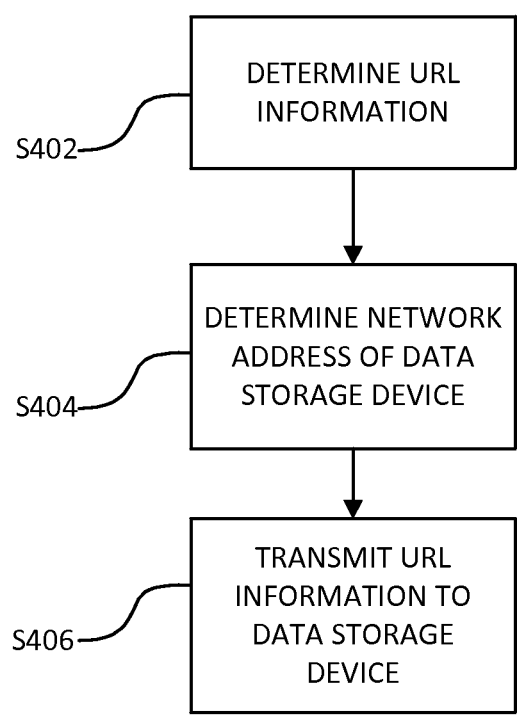
FIG. 4 depicts a process for downloading data from a network site according to an embodiment.

The electronic device 102 can, for example, transmit universal resource locator ("URL") information of a network site to the data storage device 104 so that the data storage device 104 can download data from the network site. In an embodiment, a process for downloading data from a network site is shown in FIG. 4. In an embodiment, one or more blocks in FIG. 4 are performed by the electronic device 102.

Figure 5:
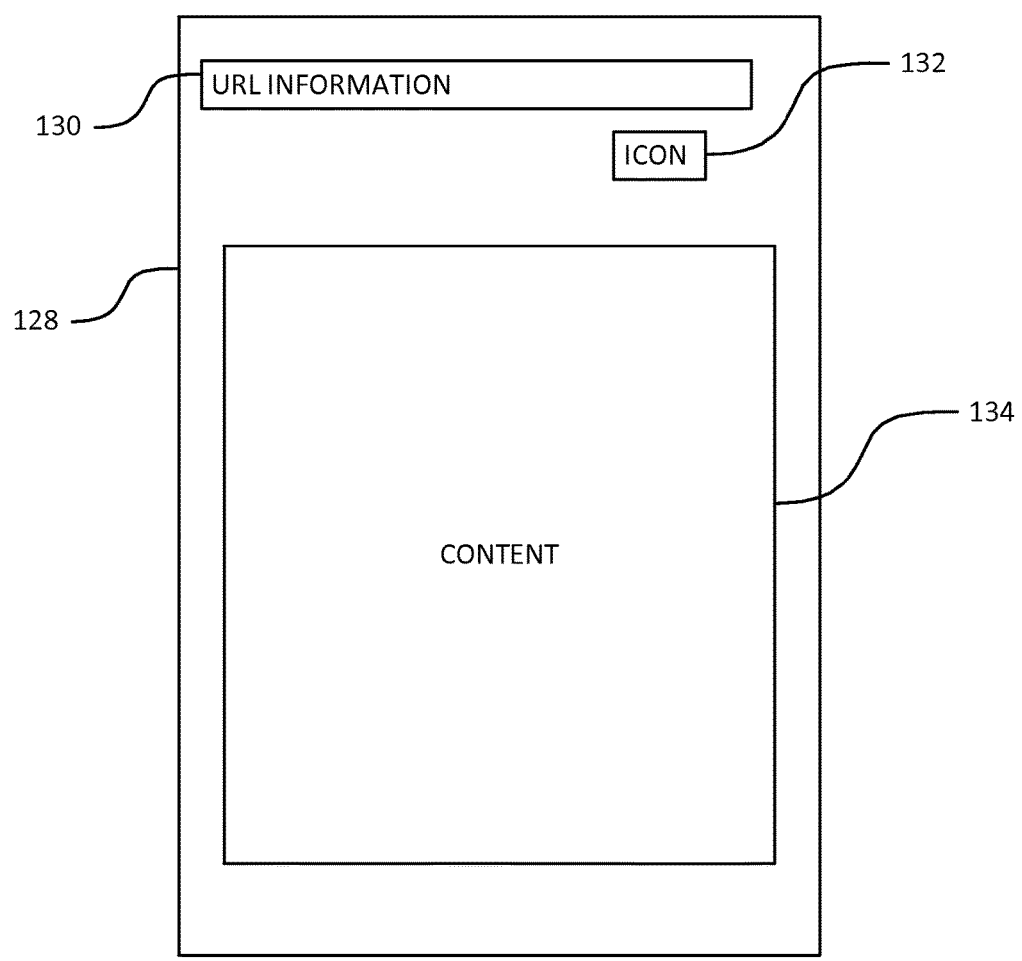
FIG. 5 depicts a network site according to an embodiment.

In block S402, the electronic device 102 is configured to determine URL information of the network site. In an embodiment, the controller 114 can determine the URL information of the current network site that a user of the electronic device 102 is accessing. For example, as shown in an embodiment in FIG. 5, the display unit 118 can display a network site 128 comprising content 134. In an embodiment the content 134 can comprise text, images, audio, video, or other multimedia content. The network site 128 can be displayed, for example, in a web browser. In the embodiment shown in FIG. 5, the display unit 118 can also display URL information 130 for the network site 128.

In an embodiment, the controller 114 will determine the URL information 130 when an indication is received from the user at the user input unit 120 to determine the URL information 130. For example, the controller 114 may display an icon 132 on the display unit 118. In an embodiment, the icon 132 can be associated with transmitting the URL information 130, such that when the user activates the icon 132, the user is indicating that the user wishes the URL information 130 to be transmitted to the data storage device 104. When the user activates the icon 132, the user input unit 120 can indicate to the controller 114 that the user has activated the icon 132. The controller 114 can then determine the URL information 130 of the current network site 128 that the user is accessing.

In an embodiment, the icon 132 can also provide an indication as to whether the URL information has previously been transmitted to the data storage device 104, whether the data storage device 104 has already downloaded data from the network site 128, whether the network site 128 has been updated since the last visit, or any combination thereof. In an embodiment, the indication can comprise different shades of color for the icon 132, additional graphics for the icon 132, different shapes for the icon 132, or any combination thereof.

The icon 132 can be activated, for example, by the user touching the icon 132, or moving a finger or hand over the icon 132. However, additional methods of activating the icon 132 may also be utilized. In an embodiment, the icon 132 can be embedded into the network site 128. In an embodiment, the controller 124 can overlay the icon 132 over the network site 128.

In an embodiment, instead of an activation of the icon 132, the indication received from the user at the user input unit 120 can comprise hand gestures. For example, certain motions of the fingers or hands of a user can correspond to an indication that the controller 114 should determine the URL information of the network site 128.

In block S404, the electronic device 102 determines the network address of the data storage device 104. For example, the controller 114 in the electronic device 102 can transmit the user account information to the server 108. The server 108 can then transmit the network address of the data storage device 104 associated with the user account information to the electronic device 102. In an embodiment, the electronic device 102 can store the user account information in the memory 116 prior to transmittal to the server 108.

In an embodiment, the electronic device 102 can require that the user provide the user account information for transmittal to the server 108. Furthermore, the server 108 can authenticate the user account information, and transmit the network address of the data storage device 104 to the electronic device 102 only when the user account information has been authenticated. In an embodiment, authentication can occur through a user account password, which the electronic device 102 can receive from the user or have stored in the memory 116.

In block S406, the electronic device 102 transmits the URL information to the data storage device 102. For example, the controller 114 can transmit the URL information of the current network site to the data storage device 104 using the network connection unit 112 and the network address of the data storage device 104.

In an embodiment, this allows the data storage device 104, instead of the electronic device 102 to download the data from the network site. This may be beneficial since the electronic device 102 may have greater limitations on bandwidth than the data storage device 104. For example, the electronic device 102 may have a higher cost per gigabyte of data transmission cost, while the data storage device 104 may have a lower cost per gigabyte of data transmission cost. This can reduce, for example, the cost of downloading data from the network site. In an embodiment, the electronic device 102 may also have a lower bandwidth, while the data storage device 104 may have a higher bandwidth. In an embodiment, this can reduce a download time of the data from the network site. Furthermore, the data storage device 104 may have a higher storage capacity than the electronic device 102.

Figure 6:
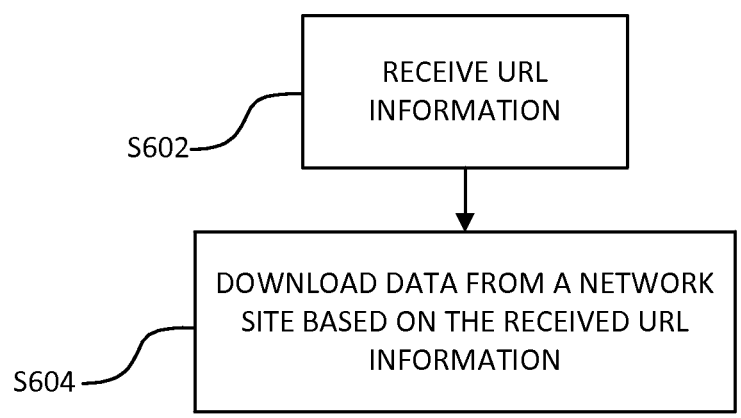
FIG. 6 depicts additional or optional steps for a process for downloading data from a network site according to an embodiment.

In an embodiment, additional or optional steps for a process for downloading data from a network site are shown in FIG. 6. In an embodiment, one or more blocks in FIG. 6 are performed by the data storage device 104. In block S602, the data storage device 104 receives the URL information from the electronic device 102. In block S604, the data storage device 104 downloads data from the network site based on the received URL information. For example, the data storage device 104 can access the network site using the URL information and download data from the network site. In an embodiment, receiving the URL information of the network site causes the data storage device 104 to download data from the network site.

In an embodiment, the data storage device 104 can authenticate the reception of the URL information from the electronic device 102 prior to commencing downloading of data from the network site. For example, the data storage device 104 may verify with the server 108 that the electronic device 102 did transmit the URL information, that the electronic device 102 is authorized to transmit the URL information, or any combination thereof. In an embodiment, the data storage device 104 is configured to automatically download the data from the network site based on the URL information when the data storage device 104 receives the URL information from the electronic device 102.

In an embodiment, authentication can occur by having the electronic device 102 including an authentication code with or within the URL information. Thus, the authentication code will be transmitted to the data storage device 104. The data storage device 104 can then authenticate the URL information using the authentication code. If the URL information has been authenticated then the data storage device 104 may commence downloading the data from the network site using the URL information.

In an embodiment, the data storage device 104 can wait to download the network site 128 until the optimal time or an opportune time arises. For example, the data storage device 104 can place the URL information in a queue. In addition, the data storage device 104 can download network sites 128 based on a determined priority of the network sites 128. In an embodiment, the data storage device 104 can download the network site 128 when it is cheaper or faster to do so, such as during the middle of the night when there is less traffic and stress on network equipment.

In an embodiment, the data storage device 104 is configured to capture the network site. That is, the data storage device 104 can download data from the network site in such a manner that the network site or portions of the network site can be reproduced even when the data storage device 104 is not accessing the network site. Therefore, folder structures of the network site can be maintained when data from the network site is downloaded.

In an embodiment, the data storage device 104 can be configured to perform different levels of data downloads of the network site. For example, the data storage device 104 can download various amounts of text, images, audio, video, multimedia content, or other types of content depending on what level of data download is selected. This can, for example, ensure that the data downloaded are relevant to what the user is requesting, or to conserve space in the data storage device 104. This can also ensure that bandwidth is utilized in an acceptable manner by the data storage device 104. Furthermore, this can also reduce download costs.

In an embodiment, the data storage device 104 can save the data from the network site for access by the electronic device 102, without having to access the network site through the URL information. That is, the electronic device 102 can view a copy or a substantial copy of the network site by just accessing the data storage device 104. This may be beneficial, for example, for archival purposes.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A data storage system comprising:
   a data storage device, having an associated network address and user account information, located on a first network and configured to download data from a network site based on universal resource locator ("URL") information of the network site;
   a server configured to store the network address and the user account information of the data storage device; and
   an electronic device located on a second network different than the first network, the electronic device having a user input unit configured to receive a user input, the electronic device configured to:
      determine the URL information of the network site in response to receiving the user input, and
      transmit the user account information to the server,
   wherein the server is further configured to:
      receive the user account information from the electronic device,
      determine the network address of the data storage device based on the user account information, and
      transmit the network address to the electronic device,
   wherein the electronic device is further configured to:
      receive the network address of the data storage device from the server, and
      transmit the URL information to the data storage device using the network address of the data storage device, and
   wherein the data storage device is further configured to:
      responsive to receiving the URL information, download data from the network site, and
      maintain folder structures of the network site upon downloading the data from the network site.

2. A method for downloading data from network sites, the method comprising:
   receiving, at a data storage device located on a first network, universal resource locator ("URL") information of a network site from an electronic device that is located on a second network different from the first network and that includes a user input unit configured to receive a user input, wherein the electronic device:
  determines the URL information in response to receiving the user input;
  receives a network address of the data storage device from a server based on user account information associated with the data storage device transmitted to the server; and
  transmits the URL information to the data storage device using the network address of the data storage device;
downloading, using the data storage device, data from the network site based on the URL information and responsive to receiving the URL information, wherein receiving the URL information from the electronic device causes the data storage device to download the data from the network site; and
maintaining folder structures of the network site on the data storage device upon downloading the data from the network site.

3. The method of claim 2, further comprising connecting to the network site and to the electronic device.

4. The method of claim 2, wherein the electronic device provides a user input element configured to cause, upon activation, the electronic device to determine the URL information of the network site.

5. The method of claim 2, wherein the network address includes an Internet Protocol ("IP") address.

6. The method of claim 2, wherein the electronic device includes circuitry configured to connect to the network site and the data storage device.

7. The method of claim 2, wherein:
  the electronic device receives the user input that causes the electronic device to determine the URL information of the network site.

8. The method of claim 2, further comprising:
  downloading data from the network site so that the network site can be reproduced while the data storage device is not accessing the network site.

9. An electronic device comprising:
  a user input unit configured to receive a user input; and
  circuitry configured to:
    connect to a network site and to a data storage device, wherein the data storage device is located on a first network and the electronic device is located on a second network different than the first network,
    determine universal resource locator ("URL") information of the network site in response to receiving the user input,
    transmit user account information to a server, the server being configured to:
      receive the user account information from the electronic device,
      determine a network address of the data storage device based on the user account information, and
      transmit the network address to the electronic device,
    receive the network address of the data storage device from the server, and
    transmit the URL information to the data storage device using the network address of the data storage device using the network connection unit, wherein receiving the URL information causes the data storage device to:
      download data from the network site, and
      maintain folder structures of the network site upon downloading the data from the network site.

10. The electronic device of claim 9, wherein the network address includes an Internet Protocol ("IP") address.

11. The electronic device of claim 9, wherein:
  the user input is configured to cause, upon activation, the circuitry to determine the URL information of the network site.

12. A data storage device for downloading data from network sites, the data storage device comprising:
  network communication means for communicating with an electronic device located on a network different from a network of the data storage device and for communicating with a network site, the network communication means being associated with a network address, the electronic device including a user input unit configured to receive a user input;
  data storage means for storing data downloaded from the network site to provide access to the downloaded data of the network site to the electronic device; and
  control means for controlling operation of the network communication means and for accessing the data storage means,
  wherein the control means is configured to receive universal resource locator ("URL") information of the network site from the electronic device using the network communication means,
  wherein the electronic device is configured to:
  determine the URL information in response to receiving the user input;
  receive a network address of the data storage device from a server based on user account information associated with the data storage device transmitted to the server; and
  transmit the URL information to the data storage device using the network address of the data storage device; and
  wherein the control means is further configured to:
  responsive to receiving the URL information, download data from the network site based on the received URL information, and
  maintain folder structures of the network site on the data storage means upon downloading the data from the network site.

13. The data storage device of claim 12, wherein the network address includes an Internet Protocol ("IP") address.

14. The data storage device of claim 12, wherein the control means is further configured to download data from the network site so that the network site can be reproduced while the data storage device is not accessing the network site.

15. The data storage device of claim 12, wherein the network communication means is further configured to connect to a host.

16. The data storage device of claim 12, wherein the URL information received from the electronic device is determined by the electronic device in response to activation of a user input element.

* * * * *